Figure 1:
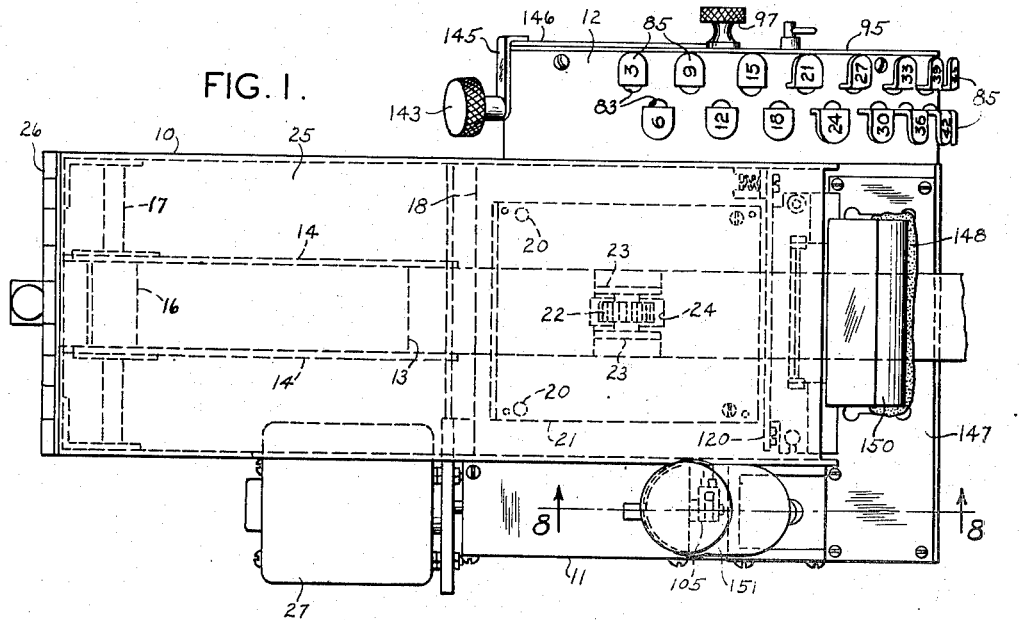

Aug. 6, 1957  C. P. TAYLOR  2,801,848
POWERED TAPE DISPENSER
Original Filed Jan. 12, 1953  4 Sheets-Sheet 1

INVENTOR,
CHARLES P. TAYLOR
BY Terry & Cohn
ATTORNEYS.

Aug. 6, 1957  C. P. TAYLOR  2,801,848
POWERED TAPE DISPENSER
Original Filed Jan. 12, 1953  4 Sheets-Sheet 2
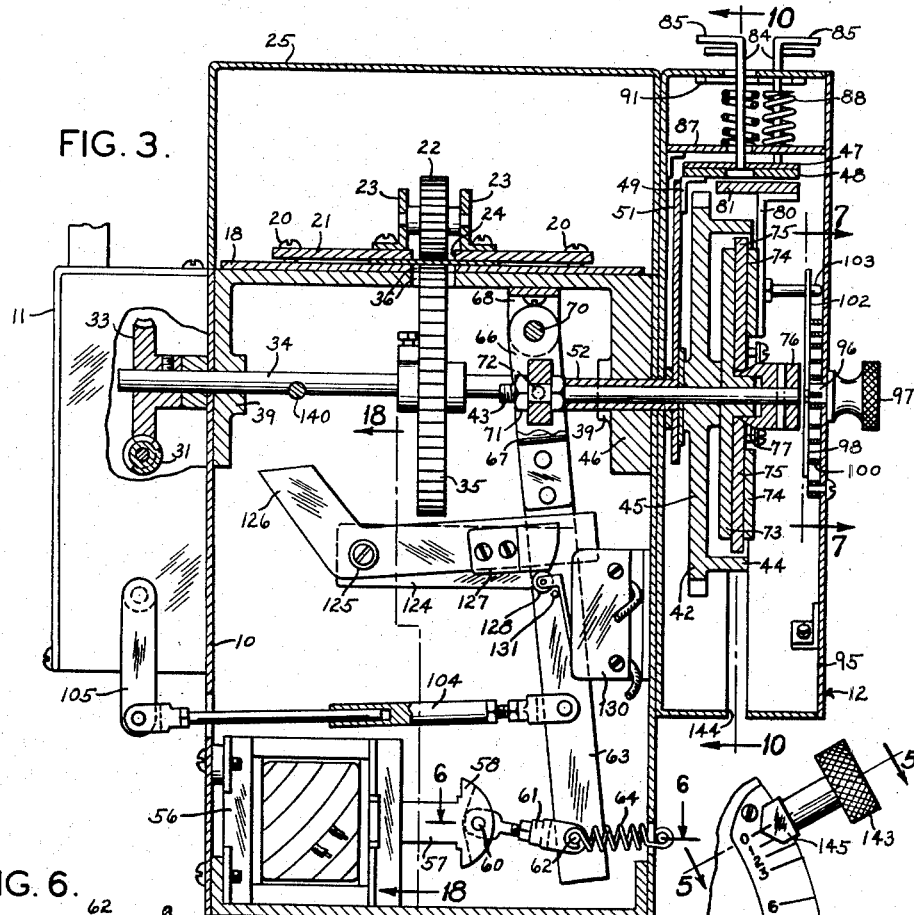
FIG. 3.
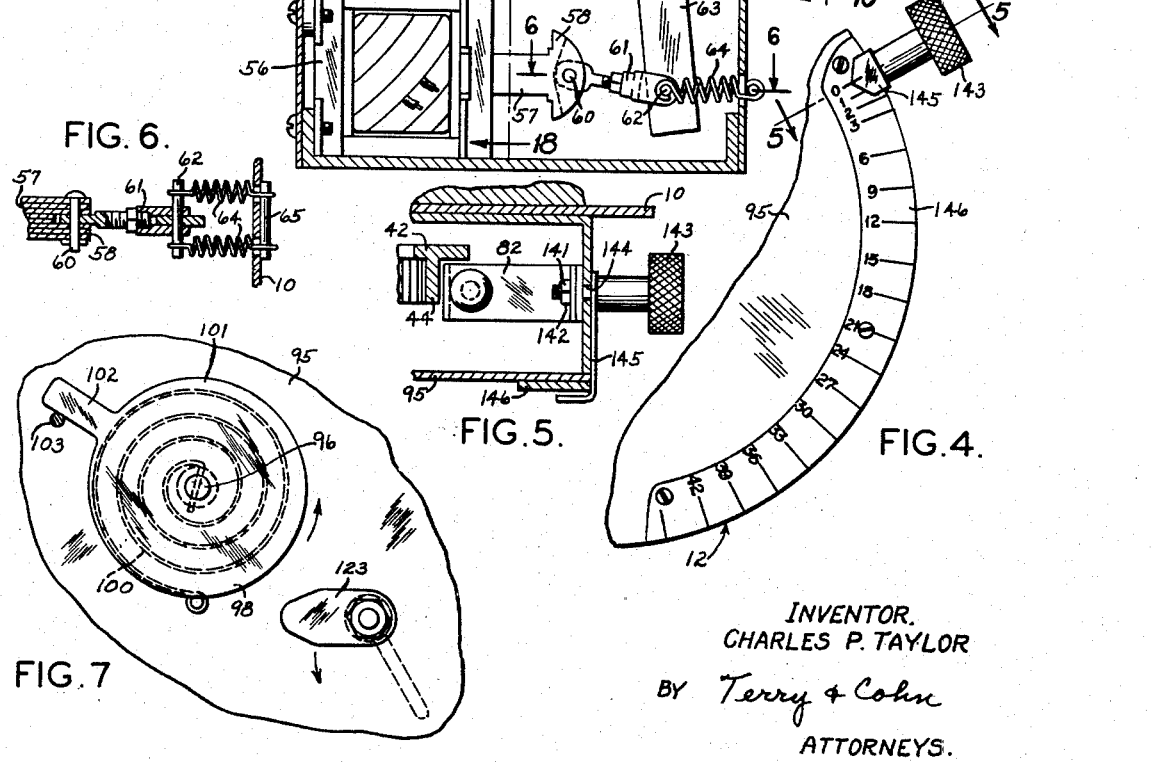
FIG. 6.
FIG. 5.
FIG. 4.
FIG. 7
INVENTOR.
CHARLES P. TAYLOR
BY Terry & Cohn
ATTORNEYS.

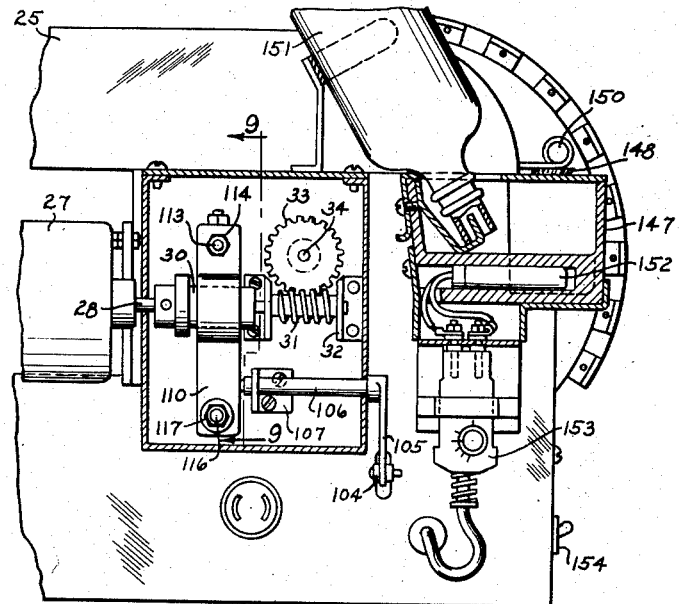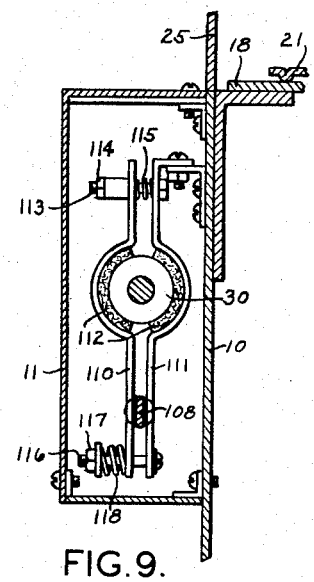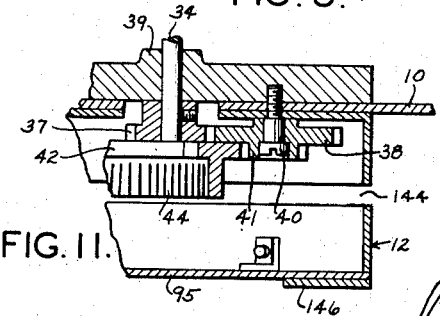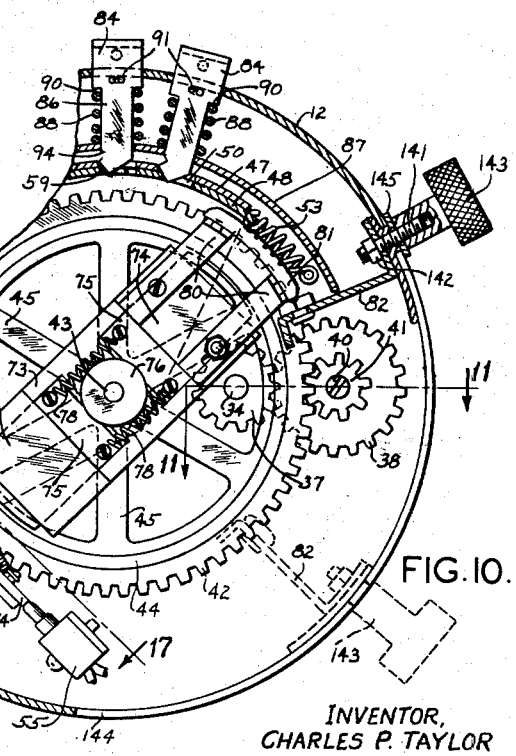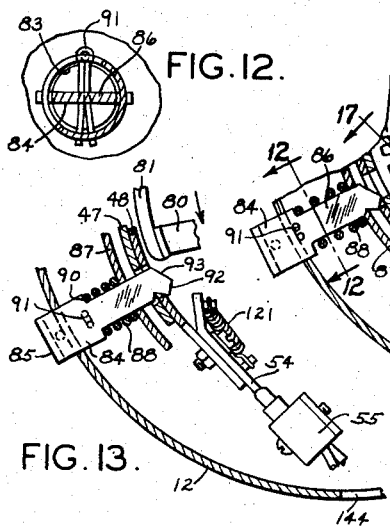

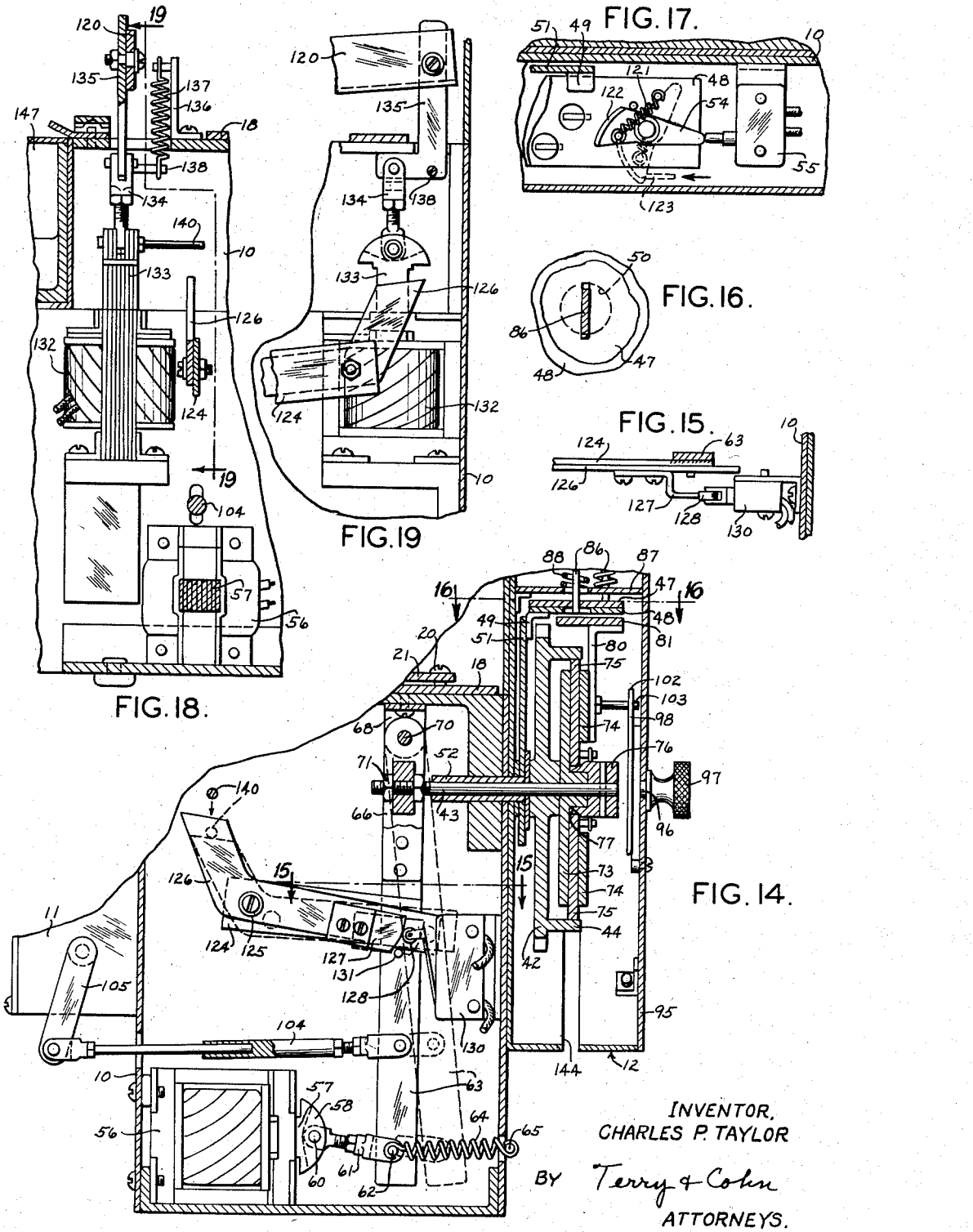

United States Patent Office 2,801,848
Patented Aug. 6, 1957

2,801,848

POWERED TAPE DISPENSER

Charles P. Taylor, Belleville, Ill., assignor to Ideal Stencil Machine Company, Belleville, Ill., a corporation of Illinois Original application January 12, 1953, Serial No. 330,766. Divided and this application September 3, 1954, Serial No. 454,046

12 Claims. (Cl. 271—2.4)

This invention relates to improvements in power-driven dispensing apparatus, and more particularly to improvements in a powered tape dispenser.

Certain of the features of the present assembly are disclosed and claimed in a copending application of this applicant, bearing Serial No. 330,766, filed January 12, 1953, of which the present application is a division.

An important object of the present improvements is to provide a power delivery means that is fully automatic, and particularly adapted to deliver a positively measured portion of the material dispensed.

Another important objective is realized in a braking assembly cooperative with the power delivery means to provide a precise measurement of the material being dispensed, and to prevent any overrunning of the delivery parts upon functional termination of the power means.

A still further and important objective is realized in a selector mechanism of a key-board type especially adapted to actuate the power delivery means incident to dispensing an accurately predetermined portion of material, each key element of the selector being significant of a particular amount of material to be delivered. In addition, the key-board selector is structurally arranged to afford a compact unit which is readily accessible for quick and easy operation and easy of access for any purpose of service.

Further objects and advantages include the provision of a separately adjustable means for providing selected increments to any predetermined minimal portion of the material to be dispensed; in other words, an adjustable means that exactly determines and signifies an additional amount of material to be added to the specific value designated by any key element of a selector mechanism. Obviously, this desirable feature further adds to the utility of the dispensing apparatus by permitting a substantial reduction in the number of key elements in the selector board, and by providing an infinite number of possible measurements of delivery between the stepped key values, thus serving a purpose of interpolation.

Yet another valuable objective of the improvements is realized in a combined limit and control switch that is so disposed and arranged as simultaneously to control the actuation of a braking assembly and of the power delivery means, and thus permit the use of a greatly simplified linkage means.

Figure 2:
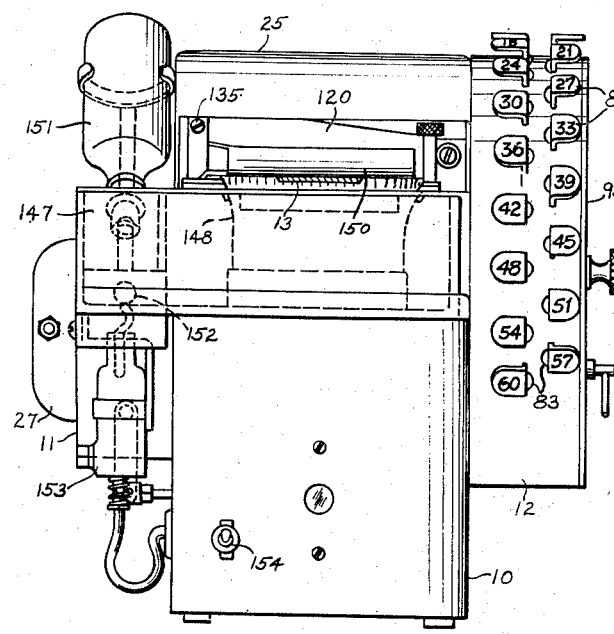
Figure 20:
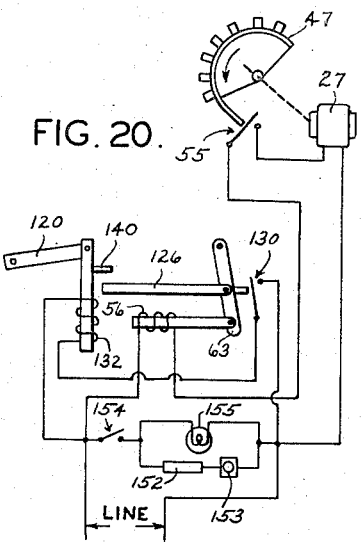

The foregoing and numerous other objects of the invention will more clearly appear from the following detailed description of a preferred embodiment, particularly when considered in connection with the accompanying drawings, in which:

Fig. 1 is a top plan view of a powered tape dispenser;
Fig. 2 is a front end view of the device shown in Fig. 1;
Fig. 3 is a view in cross section as taken along a vertical plane passed through the axis about which the gear drum revolves;
Fig. 4 is a fragmentary side elevational view of the circular cover plate of the key board and of the increment adjusting means;
Fig. 5 is a fragmentary cross sectional view of the increment adjusting means as taken along line 5—5 of Fig. 4;
Fig. 6 is a cross sectional view as taken along line 6—6 of Fig. 3;
Fig. 7 is a fragmentary view of the reset mechanisms carried by the cover plate of the key board, as seen along line 7—7 of Fig. 3;
Fig. 8 is a cross sectional view as taken along line 8—8 of Fig. 1;
Fig. 9 is a view in cross section as taken along line 9—9 of Fig. 8;
Fig. 10 is a fragmentary cross sectional view as taken along line 10—10 of Fig. 3;
Fig. 11 is a cross sectional view as taken along line 11—11 of Fig. 10;
Fig. 12 is an enlarged cross sectional view as taken along line 12—12 of Fig. 10;
Fig. 13 is a fragmentary view similar to Fig. 10, but showing the clutch assembly in an angularly displaced position;
Fig. 14 is a fragmentary view in cross section similar to that shown in Fig. 3, but showing the position of the component parts after actuation of the control switch;
Fig. 15 is a view in cross section as taken along line 15—15 of Fig. 14;
Fig. 16 is an enlarged cross sectional view as taken along line 16—16 of Fig. 14;
Fig. 17 is a fragmentary view, partly in cross section, as seen along line 17—17 of Fig. 10;
Fig. 18 is a fragmentary view, partly in cross section, as seen along line 18—18 of Fig. 3, showing the automatic cut-off assembly;
Fig. 19 is a fragmentary view, partly in section, as seen along staggered line 19—19 of Fig. 18, and
Fig. 20 is a circuit diagram of the electrical control system.

Referring now by characters of reference to the drawings, it will be noted that the tape dispenser is provided with three separate housing structures, as best seen in Figs. 1, 2 and 3. The middle housing structure 10 is the largest of these sections, and carries the major portion of the electrical equipment, drive and control mechanism, the smaller adjacent rectangular housing section 11 enclosing the brake and gearing assembly, and the circular section of 12 serving the key selector and connecting clutch mechanism.

A roll of tape 13 is located in the middle section 10, and is positioned between lateral plates 14 and supported on rollers arranged so as to permit the tape roll to rotate freely. The tape strip is extended upwardly, thence trained over a flanged pulley 16 rotatively connected to a transverse shaft 17 secured to the rear portions of the opposite walls of the middle housing part 10. The tape strip extends forwardly of the pulley 16 and overlies the bed plate 18 secured to the top wall of the enclosure section 10.

Detachably secured by the screws 20 to the bed plate 18 is a platen 21 which carries a pressure wheel 22 pivotally connected to spaced brackets 23 fixed to platen 21. The pressure wheel 22 and platen 21 are so arranged that the underlying tape strip is allowed to slide with only a relatively minor frictional resistance between the bed plate 18 and platen 21, and will engage operatively the pressure wheel 22 through rectangular aperture 24, as shown in Fig. 3. An elongate cover 25 is hinged to the uppermost rear portion of the middle housing 10 by hinge 26, the cover 25 having downwardly curvilinear end portions, and concealing the above described structure when swung down to a fully closed position.

Motor 27 is located partly within the middle housing structure 10, and armature 28 thereof is coupled to a brake shaft 30 (Fig. 8), the brake assembly being later fully described, and thence connected to a worm drive gear 31. Spaced brackets 32 fixed to the middle housing 10 support and position the worm gear 31 relative to a driven gear 33 secured to one end of drive shaft 34 which extends through the section 10 and into the circular housing structure 12. From Fig. 3 it is seen that shaft 34 carries a knurled tape-feeding or driving wheel 35, constituting a rotary delivery wheel, the wheel 35 being fixed to the shaft 34 immediately below pressure wheel 22, and being located so as to extend through registering apertures 36 formed in the top wall and bed plate 18 to engage the underside of the tape strip.

The drive shaft 34 is rotatively journalled in spaced bossed regions 39 formed on the opposite walls of the middle housing section 10, as viewed in Figs. 3 and 11. That end portion of shaft 34 which projects into the circular housing 12 (Figs. 10 and 11), carries a driving gear 37 in mesh with driven gear 38 rotatively connected by pin 40 to the housing. A smaller pinion 41 rotatively connected to gear 38, meshes with the toothed periphery of a gear drum 42, thus acting to revolve the drum 42 about an axis identified with rod 43.

Gear drum 42 is provided with an annular flange or clutch band 44, and a hub connnected to the toothed and flanged periphery by spokes 45, the hub being rotatively carried on rod 43. Rod 43 is journalled in a bossed region 46 (Fig. 3) and in the adjacent walls of the middle and circular housing structures.

Disposed over substantially one half the circumference of drum 42, and in spaced parallel relation with the integral gear teeth, is a pair of attached, superimposed arcuate plates 47 and 48 which serve as switch-actuating bars. A series of apertures 50 are formed in the arcuate plates, and are located so as to afford two separate and distinct rows. The apertures 50 of one row are staggered with respect to the apertures 50 of the other row, so as to lie opposite the solid intervening and connecting portions between the apertures of the adjacent row. The apertures 50 in arcuate plates 47 and 48 are in register, but are of slightly different size and configuration, or otherwise stated the apertures 50 of the lowermost arcuate plate 48 are smaller than those formed in the uppermost arcuate plate 47, thus constituting an offset arrangement that provides a camming surface or shoulder 59 (Fig. 10), as well as a keeper member coacting in latching the individual key plungers elsewhere herein described.

The apertured arcuate plates 47 and 48 (Fig. 3) are connected by bracket 49 to a vertical connecting plate 51 secured to sleeve 52 journalled on rod 43. A tension spring 53 is secured to one end of the arcuate plates 47 and 48, and is anchored at its opposite end to the housing structure, the spring 53 being loaded to urge the plates clockwise or into the position shown by Fig. 10. Of course, the above structural arrangement permits the arcuate plates 47 and 48 to be rocked counterclockwise within a narrow range, about the rod axis against the loading of spring 53.

A projecting finger piece, generally indicated at 54 and later described, is attached to the opposite end portion of the lower-most arcuate plate 48, and is adapted to operate as a safety device, later described as to function. The finger piece 54 extends slightly beyond the end of the arcuate plates and engages the plunger of control switch 55.

Solenoid 56, seen in Figs. 3 and 14, is operated by control switch 55 through an electrical circuit later discussed, and is secured to the middle housing 10 by screws. A movable laminated armature 57 is slidably disposed within the solenoid 56, and terminates in a semi-circular head formation 58. Pivotally connected to head formation 58 by pin 60 (Fig. 6), is a bifurcate link element 61, the latter being pivoted by pin 62 to lever arm 63 that is located between the furcate parts. Pivot pin 62 projects outwardly on each side of the link element and serves to anchor a pair of spaced tension coil springs 64. The opposite ends of spring 64 are extended through spaced apertures in the housing, and are secured to the housing by blocking pin 65. Springs 64 tend to hold the solenoid armature 57 and lever arm 63 in the position shown by Fig. 3.

The lever arm 63 is extended upwardly, and is provided with an outwardly curved upper end portion 66 (Fig. 3), which forms a yoke when a complementary curved piece 67 is attached to the lever arm 63. This yoke is pivoted and secured to bracket 68 by pin 70, the bracket 68 being fixed to the top wall of the middle housing section 10. The yoke of lever arm 63 also receives and positions the inner end of rod 43, which is threadedly received by nut 71 pivotally connected by pins 72 to the spaced yoke parts, as seen in Fig. 3.

The clutch assembly is disposed within and cooperates with the annular flange of drum 2, and includes a rectangular plate or clutch member 73 that is rotatively received by rod or shaft 43. The rectangular clutch member 73 is provided with spaced overlying end pieces 74 (Figs. 3 and 10) which form channels or guides for slidably movable gripping elements or clutch shoes 75. The outermost portions of shoes 75 are formed to provide an arcuate surface compatible with the annular flange 44 of drum 42.

A shoe-actuating element 76 is fixed to the outer end of rod 43, and includes a recessed portion that slidably receives the projecting hub of the rectangular member 73, and a sloped camming region 77 (Fig. 3) which converges toward the opening of the recessed portion and which is adapted to shift the shoes 75 radially outward into gripping engagement with the annular flange 44 of rotatable drum 42 when rod 43 is axially displaced by lever arm 63. The shoes 75 are operatively interconnected by a pair of springs 78 (Fig. 10) that tend to hold the shoes 75 in a retracted position out of frictional engagement with drum 42. Connected to one overlying end piece 74, is a striker 80 which includes an arcuate portion 81 arranged parallel to and closely adjacent the lower surface of the lowermost arcuate plate 48.

Fig. 10 discloses the clutch assembly in a starting or at rest position, the striker 80 abutting a cushioned abutment of arm 82 shown in full lines. Arm 82 is adjustable to other positions, as represented by the dotted lines, to shift the starting position of the clutch assembly, the particular structure and function of which being subsequently described.

A peripheral portion of the circular housing 12 is provided with two rows of spaced apertures 83, the apertures 83 of each row being staggered relative to the apertures of the adjacent row, as viewed, in Figs. 1 and 2, and being of a size to receive key element 84. Each key element 84 constitutes a plunger or stop element subject to depressing actuation and is characterized by a horizontally disposed tab 85 at the outer end to provide a convenient finger abutment, and a vertical shank 86 (Fig. 10), being the plunger proper, and having a reduced lower portion.

An arcuate wall member 87 secured to housing 12 is located above arcuate plates 47 and 48, and is also provided with registering apertures through which the reduced shank portions 86 of the key elements 84 extend. A compression spring 88 is disposed as a return or restoring element about each key shank 86, and abuts wall 87 and a shoulder 90 formed on the key element, the spring 88 being adapted to urge the key element 84 outwardly to the inoperative or raised position shown by Figs. 3 and 10. Pin 91 limits and determines this outermost position (Figs. 10 and 12).

The lowermost end portion of each key shank 86 is provided with two downwardly convergent camming margins 92 and 93 (Fig. 13) one of which 92 is adapted to coact with the shoulder 59 formed by the offset arrangement of the differently sized apertures of arcuate plates 47 and 48 to shift the plates slightly to a switch-engaging position, and the other camming margin 93 being adapted to cooperate with striker 80 to disengage the key element 84 from a latched relation to the arcuate plates, and to force the key element to a raised position. Closely adjacent and located slightly above camming margin 92 which coacts with the arcuate plates 47 and 48, is a notched or indented region 94 which receives a portion of arcuate plate 48 and detachably secures the key element 84 in a releasably latched relation to the plate when the key or plunger is in a depressed position. It will be noted that the force exerted by spring 53 retains the arcuate plate 48 in the indented region 94 of the depressed key element 84.

Removable circular cover plate 95 (Figs. 3 and 7) is detachably secured to the housing 12, and provides a journal for a short shaft 96 which connects knob 97 and spring-plate 98. A wound or clock-type spring 100 is disposed intermediate the spring-plate 98 and the cover plate 95, and is connected at one end to the shaft 96 as a spring arbor, and at the outer end to cover plate 95. Spring-plate 98 includes a circular portion 101 and finger projection 102 normally abutting a horizontal projection 103 connected to the clutch. The loading of spring 100 tends to urge the finger projection 102 against clutch projection 103, and hence acts to return the clutch to the starting position shown in Fig. 10. The knurled knob 97 permits manual adjustment of spring-plate 98, and particularly the location of finger projection 102 relative to projection 103 incident to cover assembly.

In addition, the lever arm 63 is operatively connected to the brake assembly. Connecting rod 104 (Fig. 3) is pivotally connected to lever arm 63 and to link member 105. A spreader bar 106, more clearly shown in Figs. 8 and 9, is supported and positioned by bracket 107, and is fixed at one end to the link member 105. The opposite end of spreader bar 106 is provided with a flat reduced portion 108 located between parallel portions of brake plates 110 and 111.

Each brake plate includes a medial substantially semi-circular portion carrying a leather strip 112 which normally frictionally grips the brake shaft 30. The upper portions of the brake plate are connected and held in spaced parallel relation by bolt 113 and nut 114, and by compression spring 115 located therebetween. A bolt 116 and nut 117 similarly connect the lower portions of brake plates 110 and 111, but a compression spring 118 is arranged between nut 117 and plate 110, thus providing a structural arrangement which tends to close the plates 110 and 111 about brake shaft 30, as shown in Fig. 9. The uppermost plate connection, previously described, permits exact realignment and adjustment incident to frictional wear of the gripping brake parts.

Upon depression of one of the plunger or stop elements identified with one of key elements 84, the camming margin 92 on the lowermost shank portion 86 bears against the offset shoulder 59 of the arcuate plates 47 and 48; and moves the plates slightly counterclockwise from the position shown in Fig. 10 to that shown in Fig. 13. The indented region 94 of key shank 86 acts to retain the arcuate plates in the shifted position against the loading of tension spring 53. Consequently, plunger of control switch 55 is depressed by the finger piece 54 of the safety device, thus operatively closing switch 55.

The closing of switch 55 starts the motor 27, and simultaneously energizes solenoid 56, which in turn produces an electromagnetic field that urges armature 57 inwardly to the left from the position shown in Fig. 3, to that disclosed in Fig. 14. Armature 57 angularly displaces lever arm 63 to a substantially vertical position shown by the full lines in Fig. 14, against the loading of tension springs 64. It is apparent that upon pivotal movement of lever arm 63, a simultaneous action is realized which releases the brake and engages the clutch. The clutch is engaged since rod 43 is axially shifted slightly to the left (Fig. 14), thereby causing the sloped camming regions 77 of the shoe-actuating element 76 to force the shoes 75 radially outward into frictional-gripping relation to the annular flange 44 of drum 42.

At the same time, connecting rod 104 is moved leftward (Fig. 14), and hence spreader bar 106 forces the brake plates apart against the loading of compression spring 118, thus releasing the motor shaft 28. Motor 27 is then allowed to operate through the train including worm gear 31 and gear 33 to rotate the tape-feeding or driving wheel 35. The clutch mechanism is concurrently rotated with drum 42 because of the frictional contact connection of shoes 75 with the drum, the drum 42 being directly driven by motor 27 through the described gear train.

Striker 80 and its arcuate portion 81 constitute a movable stop member, limiting member or switch-actuating arm which rotates counterclockwise about the rod axis with clutch 73 until it engages the selected depressed stop element or key element 84, Fig. 14 revealing the position of striker 80 just before engagement. As the striker 80 abuts camming margin 93 of the depressed key element or plunger, the key element is disengaged from arcuate plates 47 and 48 and pushed upwardly by the camming action of the key and the plates, whereupon spring 88 readily returns the key or plunger element to its normal raised position.

Immediately upon disengagement of key element 84, tension spring 53, having been loaded by the depression of the selected key, urges the arcuate plates 47 and 48 back to the normal or at-rest position shown in Fig. 10, and hence opening control switch 55. The motor 27 and solenoid 56 are thus simultaneously de-energized, thus permitting the tension springs 64 to pull the solenoid armature 57 and lever arm 63 back to the position shown in Fig. 3. As lever arm 63 is angularly displaced or pivotally returned, the spreader bar 106 is rotated by the action of connecting rod 104 and link element 105, to allow the brake plates 110 and 111 to grip and lock shaft 30 through the compressive force of spring 118, and hence completely stop the rotative action of motor 27. Consequently, it is clear that rotation of tape-feeding or delivery wheel 35 is halted at once upon opening of the control switch 55, thus, by prevention of overrunning by the brake, providing for an accurate measurement of the amount of tape fed under the cut-off mechanism.

Simultaneously, as lever arm 63 is angularly displaced back to the normal at-rest position, the shoe-actuating element 76 is axially shifted outwardly to release shoes 75 which are returned to a retracted position by the action of springs 78. When shoes 75 release the clutch assembly from the drum 42, the spring-operated plate 98 quickly and easily returns the clutch to the starting location against arm 82, as seen in Fig. 10. Of course, the rotation of drum 42 is stopped, since it is connected by the gear train to the motor 27 which is de-energized by the opening of control switch 55. The component parts of the tape dispenser, described above, are now restored to the normal starting positions, and are ready for any subsequent repetition of the working or dispensing cycle incident to a depression of one of the key-plunger elements 84.

Each key element 84 on the circular keyboard is provided with a separate and distinct character of designation, such as a number, indicative of the amount of tape fed under cutting blade 120 by the driving wheel 35 serving as a material-delivery member. Obviously, the spaced and staggered arrangement of the rows of key elements 84 causes the clutch 73 and striker 80 to move a certain specified distance from the starting position adjacent arm 82, to operative engagement with any particular depressed key element 84, upon actuation of gear drum 42 and integral clutch band or annular flange 44 by the motor 27 through the previously described gearing arrangement. For example, if any particular key element 84 is depressed, the clutch assembly rotates from starting arm 82 to the specific key-plunger element 84, thus allowing the control switch 55 to remain closed for a time interval sufficient to permit delivery wheel 35 to feed that amount of tape under the cutting blade 120 which is equal to the value indicated on the selected key element 84, considered as a selector.

If for some obscure reason, the striker 80 fails to disengage a depressed key-plunger element 84 from latched engagement with arcuate plates 47 and 48, the control switch 55 will remain closed, but the striker 80 will eventually engage during the course of its travel the safety device more clearly disclosed in Fig. 17.

This safety arrangement includes a spring 121 connected to arcuate plate 48 and to finger piece 54, and tends to urge the piece 54 clockwise into the position shown by the full lines. The rear portion of the finger piece 54 affords an obliquely inclined camming shoulder 122 adapted to engage the striker 80 during the over-run condition under the circumstances described above. The striker 80 in coaction with shoulder 122, acts to revolve piece 54 to the angularly displaced position shown by the dashed lines, thus completely disengaging finger piece 54 from control switch 55 and opening the switch to cut off the electrical power from motor 27 and solenoid 56. An arm 123 (Figs. 7 and 17) pivotally carried by the circular cover plate 95 is adapted to reset the pivoted safety piece 54 after the clutch assembly is returned to its starting position, but is only required to be used in the event spring 121 does not function to revolve automatically the piece 54 (Figs. 7 and 17). If spring 121 does not operate to return safety piece 54 from the dotted line position (Fig. 17) to the full line position, the arm 123 may be rotated by an outside handle (Fig. 7) until the arm 123 engages piece 54 and moves it to the operative position.

Cooperating with the action of lever arm 63 is a transverse lever system or switch-actuating means which actuates the cut-off mechanism, this system consisting of an arm 124 fixed at one end to lever arm 63, and pivotally connected at the opposite free end to an apex portion 125 of an angular rocker arm 126. Secured to rocker arm 126 is a projecting cam element 127, best viewed in Figs. 3, 14 and 15. In the normal at-rest position of lever arm 63 (Fig. 3), the cam element 127 is supported on top of wheel and spring arm 128 of switch 130 fixed to the housing.

When lever arm 63 is moved to the vertical position of Fig. 14, the rocker arm 126 pivots slightly clockwise (Fig. 14) to the location determined by stop pin 131 on lever arm 63, and hence automatically presets switch 130, since the curvilinear end of cam element 127 is now located in adjacent abutting relation to the wheel and spring arm 128. After the specified amount of tape is delivered under the cutting blade 120 which constitutes a material cut-off means or severance element, the control switch 55 is opened by the events previously discussed, and lever arm 63 is angularly displaced to the position shown by the dashed lines in Fig. 14. This return displacement of lever arm 63 forces cam element 127 on rocker arm 126 against the switch wheel 128, and hence closes switch 130.

Solenoid 132 (Figs. 18 and 19) is energized through switch 130, and creates an electromagnetic field which acts on laminated solenoid armature 133. The semi-circular head formation of armature 133 is pivotally connected to one end of link element 134, the opposite end of link element 134 being pivotally connected to an L-shaped member 135 secured to the free end of the cutting blade 120. Bracket 136, attached to the top wall of the middle housing 10, serves as an anchorage for one end of tension spring 137, the other end of which is connected to a pin 138 fixed to the L-shaped member 135, the spring 137 being adapted to urge cutting blade 120 to the opened or raised position shown.

Upon closing switch 130, solenoid 132 is energized and acts to pull the armature 133 and hence the cutting blade 120 downwardly against the loading of spring 137.

After the tape is completely severed, a horizontal projecting rod 140 connected to the solenoid armature 133 strikes the angularly upturned portion of rocker arm 126, and pivots rocker arm 126 clockwise (Fig. 19) or counterclockwise (Fig. 14), thus operatively disengaging the cam element 127 from switch 130. Immediately when switch 130 is opened, solenoid 132 is de-energized, whereupon spring 137 restores the cutting blade 120 and solenoid armature 133 to the fully raised or inoperative position Although the selection of any particular key-plunger element 84 will deliver a specified amount of tape, it is sometimes advantageous and desirable to deliver an amount other than that specifically shown and determined by any of the key elements. To accomplish this result, a delivery increment means is provided, which consists of an abutment arm 82 slidably connected to the circular housing 12 by threaded pin 141 and nut 142, as shown in Figs. 5 and 10. A knob 143 received by pin 141 permits the arm 82 to be fixed or adjusted in any location within the range determined by the length of an elongate or limiting means 144 formed in the housing.

The adjustment of arm 82, as for example to the position represented by the dashed lines of Fig. 10, resets the starting point of the clutch assembly that abuts arm 82, thus requiring the clutch to travel a greater distance before the striker 80 disengages a selected depressed key element 84, and permitting the tape-feeding or delivery wheel 35 to rotate for an additional distance dependent on the established location of arm 82.

A pointer 145 secured to arm 82 indicates on a scale 146 formed on the circular cover plate 95, the added amount or increment of tape delivery caused by resetting the starting position of the clutch within the range determined by slot 144. Of course, this additional amount of tape, indicated by scale pointer 146, which will be fed under the cutting blade 120 by driving wheel 35, should be added to the value designated by any particular key element 84 in order to ascertain the total length of tape delivered when that key is depressed. The above described delivery means permits any desired length of tape to be delivered and controlled by the key selector means in amounts other than that particularly designated by the key elements alone. Thus the increment means described, provides in effect, for delivery of any amount of material, such as tape for example, within and somewhat beyond the range of key-indicated values.

A separate compartment or reservoir 147 (Figs. 1, 2 and 8) supplies water to brush 148 for moistening the adhesive on the tape as it is fed under the cutting blade 120 and subsequently pulled free of the dispenser. Holding the tape strip against the brush, is a weighted element 150 pivotally connected at one end portion to the top wall of the middle housing.

Furthermore, bottle 151 is filled with water or other adhesive softener and slowly replenishes the supply of the reservoir 147 upon any depletion due to evaporation or use. A heating element 152 (Figs. 2 and 8) is installed in the reservoir 147 to heat the water, and is provided with a rheostat plug 153 to control the temperature. Switch 154 is connected to the heating circuit connected to the source of power.

Fig. 20 discloses the electrical circuit and controls, and more specifically the key selector means which actuates control switch 55 to energize motor 27 and solenoid 56, the lever arm 63 and transverse lever system which actuates switch 130 to energize solenoid 132 which actuates cutting blade 120, and switch 154 that causes energization of the heating element 151 and lamp 155.

Although the improvements have been described by making particularized reference to a single preferred embodiment, the detail of description is not to be understood as restrictive, numerous variants being possible within the principles disclosed and within the fair scope of the claims hereunto appended.

I claim as my invention:

1. In an electrical device for delivering a predetermined amount of material from a storage supply thereof, a rotatable material-delivery element, an electric motor, gearing connecting said motor and the delivery element, a motor switch in circuit with the motor for starting and stopping same, an oscillatable movable switch-actuating arm connected to be driven by said motor and proportionately to the extent of movement of said delivery element, a row of manually actuable, delivery-limiting plungers arranged along the path of the switch-actuating arm, and upon actuation being individually selectively engageable by said arm, a connection from the group of plungers to the motor switch arranged to effect switch actuation in one direction upon depression of a selected one of the plungers, any selected actuated plunger being engageable by the movable arm to restore the actuated plunger to inoperative position.

2. The combination and arrangement of elements as recited by claim 1, but further particularized in that the said connection includes a movable switch actuating bar adapted to be displaced by depression of any selected plunger, in a direction and to an extent to cause closure of the motor switch.

3. In a device for dispensing various measured amounts of material from a supply thereof, a rotatable material-delivering member, an electric motor, gearing connecting the motor to said delivery member, a motor circuit including a switch, a switch-actuating bar, a row of depressible plungers arranged along the bar, the bar and each of the plungers having cooperating camming and following surfaces such that, upon depressing actuation of any of the plungers, the bar is actuated by the selected plunger in a switch-closing direction, a stop member movable along the row of plungers for coaction with a selected one thereof, means coacting with the switch-actuating bar upon engagement of any plunger by the stop member, to release such plunger from the bar with return of the bar to switch-opening position, and means for driving the stop member proportionately to the extent of rotation of the material delivery element.

4. In a quantity control device for use with a power driven material dispenser, the combination including an electric motor, a rotatable material delivery element driven by the motor, a row of plungers, a switch-actuating bar movably mounted and arranged along the row of plungers, the bar and plungers being provided with cooperating camming and following surfaces to provide for a releasable latching relation of the bar to the selected plungers, a motor switch having actuated connection with said bar, the plungers being individually and selectively latchable to said bar so that said surfaces realize actuation of the bar in a direction to close the motor switch, and a traveling member movable along a path intersected by any selected plunger, and movable responsively to the extent of movement of the rotatable material delivery element, the traveling member being adapted to engage any selected latched plunger for unlatching actuation of same, and means for actuating the bar in a direction to effect an opening of the motor switch.

5. In a material delivering and measuring device, an electric motor, a rotary delivery member connected in power driven relation to the motor, a switch in the motor circuit for starting and stopping the motor, a movably mounted arcuate switch-actuating bar, an arcuate row of plungers adjacent the bar, the bar having apertures for the plungers, the bar and plungers being provided with cooperating camming and following surfaces to permit releasable latching connection of any selected plunger to the arcuate bar, and to move said bar in a switch-closing direction, a rotary stop member movable along the row of plungers and proportionately to the extent of movement of the rotatable delivery element, the rotary stop member adapted to engage any selected depressed plunger for release of such plunger from latching engagement with the arcuate bar, and means for moving the bar in a switch-opening direction.

6. The combination and arrangement of elements as recited by claim 5, but further characterized by the addition of means operable to return the rotary stop member to a common starting position following release of any selected plunger by the stop member.

7. In a power driven dispenser for the measured removal of strip material from a supply thereof, a strip-delivery wheel rotatable in engagement with the strip to be dispensed, a motor for driving said wheel, a switch in the motor circuit for starting and stopping same, a rotary stop member, driving connections from the motor to said stop member for the actuation of same in timed relation to said wheel, a row of plungers each significant of a length of material to be dispensed, and physically arranged along the path of the rotary stop member in a manner to predetermine the extent of travel thereof, the plungers being arranged for individual abutment by the rotary stop member following a predetermined extent of its travel, and a switch-operating connection operable responsively to engagement of any selected plunger by the stop member, to open the switch, thereby to stop the motor, whereby to determine the length of strip material delivered by said wheel.

8. In an electrically powered device for delivering a predetermined amount of strip material from a supply thereof, a strip-delivery wheel rotatable in engagement with the strip to be dispensed, a motor for driving said wheel, a rotary clutch member, driving connections from the motor to said clutch member for rotative actuation of same in timed relation to said wheel, said clutch member including means for selectively engaging the said driving connections, an electric circuit and control elements associated with the motor and clutch member, and including a switch, a rotary stop member connected to and rotatable with said clutch member, a row of plungers each significant of a length of material to be dispensed, and physically arranged along the path of the rotary stop member in a manner to predetermine the extent of travel thereof, and a switch-operating connection from the group of plungers to the switch arranged to effect closing of the switch upon depression of one of the plungers, thereby to start the motor and engage the clutch member, the plungers being arranged for individual abutment by the rotary stop member, the switch-operating connection being operable responsively to engagement of any selected depressed plunger by the stop member, to open the switch, thereby to stop the motor and disengage the clutch member, whereby to determine the length of strip material delivered by said wheel.

9. In an electrical device for delivering a predetermined amount of strip material from a storage supply thereof, a rotatable material-delivery wheel, an electric motor for driving said wheel, a rotary clutch member, driving connections from the motor to said clutch member for rotative actuation of same proportionately to the extent of movement of said delivery wheel, said clutch member including gripping elements for selectively operatively engaging said driving connections, a brake assembly arranged to stop driving actuation of said motor, an electric circuit and control elements associated with the motor, clutch member and brake assembly, and including a switch, a rotary stop member connected to and rotatable with said clutch member, a row of manually actuable, delivery-limiting plungers arranged along the path of the rotary stop member, and upon actuation being individually selectively engageable by said stop member, and a switch-operating connection from the group of plungers to the switch arranged to effect closing of the switch upon depression of a selected one of the plungers, thereby to release the brake assembly, to start the motor and to engage the clutch member for rotative movement, the switch-operating connection being operable responsively to engagement of any selected depressed plunger by the stop member, to open the switch, thereby to stop the motor, to lock the brake assembly and to disengage the clutch, whereby to determine the length of strip material delivered by said wheel.

10. The combination and arrangement of elements as recited by claim 9, but further characterized by the provision of a spring-actuated arm operable to return the rotary clutch member and stop member to a common starting position following release of any selected plunger by the stop member, opening of the switch, and hence operative disengagement of said gripping elements of the clutch member from the driving connections.

11. In a device for delivering a predetermined amount of a measurable material, a rotatable material-delivery element, a power unit in driving relation to the delivery element, a switch in circuit with the power unit for starting and stopping same, a movable stop member operatively connected to move with and proportionately to the delivery element, a switch-actuating bar, a row of plungers arranged along the bar and arranged along the path of the stop member, and upon actuation being individually selectively engageable by said stop member, the bar being actuated by the plungers in a switch-closing direction upon depression of a selected one of the plungers, any selected actuated plunger being engageable by the movable stop member to restore the actuated plunger to inoperative position, a projecting finger piece carried by the bar and arranged to actuate said switch, the finger piece being arranged along the path of the movable stop member and engageable therewith upon overrun condition to open said switch and stop said power unit.

12. The combination and arrangement of elements as recited by claim 11, but further characterized in that the finger piece is pivoted to one end of said bar, and adapted to be moved about its pivotal axis upon engagement with said movable stop member, whereby to open said switch, and spring means for resetting the pivoted finger piece.

References Cited in the file of this patent

UNITED STATES PATENTS

| | | |
|---|---|---|
| 1,304,977 | Helsel | May 27, 1919 |
| 1,732,635 | Chabot | Oct. 22, 1929 |
| 1,960,945 | Krueger | May 29, 1934 |
| 1,998,069 | Beutel | Apr. 16, 1935 |
| 2,066,617 | Gautier | Jan. 5, 1937 |
| 2,171,667 | Mickelson et al. | Sept. 5, 1939 |
| 2,298,492 | Longfield | Oct. 13, 1942 |
| 2,315,446 | Miller et al. | Mar. 30, 1943 |
| 2,408,363 | Beckman et al. | Oct. 1, 1946 |